(12) United States Patent
Yamada

(10) Patent No.: US 11,619,256 B2
(45) Date of Patent: Apr. 4, 2023

(54) HALF THRUST BEARING AND BEARING DEVICE FOR CRANKSHAFT OF INTERNAL COMBUSTION ENGINE

(71) Applicant: DAIDO METAL COMPANY LTD., Nagoya (JP)

(72) Inventor: Tomohiro Yamada, Inuyama (JP)

(73) Assignee: DAIDO METAL COMPANY LTD., Nagoya (JP)

( * ) Notice: Subject to any disclaimer, the term of this patent is extended or adjusted under 35 U.S.C. 154(b) by 0 days.

(21) Appl. No.: 17/696,128

(22) Filed: Mar. 16, 2022

(65) Prior Publication Data
US 2022/0307546 A1   Sep. 29, 2022

(30) Foreign Application Priority Data

Mar. 24, 2021 (JP) .............................. JP2021-049342

(51) Int. Cl.
*F16C 9/02* (2006.01)
*F01M 11/02* (2006.01)

(52) U.S. Cl.
CPC ............... *F16C 9/02* (2013.01); *F01M 11/02* (2013.01)

(58) Field of Classification Search
CPC .... F16C 9/02; F16C 9/04; F02M 3/14; F02M 17/022; F02M 33/1065; F02M 2360/22; F02M 17/10; F02M 33/122; F02M 17/047
See application file for complete search history.

(56) References Cited

U.S. PATENT DOCUMENTS

| | | | |
|---|---|---|---|
| 6,575,635 B1* | 6/2003 | Tsuji | F16C 33/121 384/907 |
| 10,184,513 B2* | 1/2019 | Takagi | F16C 33/1065 |
| 2002/0126924 A1* | 9/2002 | Okamoto | F16C 9/04 384/276 |
| 2011/0058761 A1* | 3/2011 | Ishigo | F16C 33/046 384/288 |

FOREIGN PATENT DOCUMENTS

| | | |
|---|---|---|
| DE | 3719789 A1 | 12/1988 |
| DE | 102016215810 A1 | 3/2017 |
| DE | 102020200947 A1 | 8/2020 |
| JP | H11-201145 A | 7/1999 |
| JP | 2014-177968 A | 9/2014 |

OTHER PUBLICATIONS

Office Action dated Sep. 23, 2022 in corresponding German Patent Application No. 10 2022 105 801.8 with English translation.

* cited by examiner

*Primary Examiner* — Syed O Hasan
(74) *Attorney, Agent, or Firm* — Harness, Dickey & Pierce, P.L.C.

(57) ABSTRACT

A half thrust bearing for a crankshaft of an internal combustion engine is formed of a back metal layer and a bearing alloy layer to have a slide surface and two thrust reliefs. Each thrust relieve includes a first region, where the back metal layer is exposed, on a circumferential end surface side, and a second region, where the bearing alloy layer is exposed, on the slide surface side while the slide surface includes two third regions adjacent to the second region, and a fourth region between the two third regions. A circumferential end region consists of the first, second and third regions. In the second region and the third regions, the bearing alloy layer includes a uniform thickness portion at a radial center, and a decreased thickness portion adjacent to an inner-diameter-side end surface.

8 Claims, 13 Drawing Sheets

Y1 VIEW

A-A CROSS-SECTION

B-B CROSS-SECTION

C-C CROSS-SECTION

A1-A1 CROSS-SECTION

B1-B1 CROSS-SECTION

C1-C1 CROSS-SECTION

HALF THRUST BEARING AND BEARING DEVICE FOR CRANKSHAFT OF INTERNAL COMBUSTION ENGINE

BACKGROUND OF THE INVENTION (1) Field of the Invention

The present invention relates to a half thrust bearing which receives axial force of a crankshaft of an internal combustion engine.

(2) Description of Related Art

A crankshaft of an internal combustion engine is rotatably supported at a journal portion thereof by a cylinder block bottom part of the internal combustion engine via a main bearing configured by combining a pair of half bearings into a cylindrical shape.

One or both of the pair of half bearings is used in combination with a half thrust bearing which receives axial force of the crankshaft. The half thrust bearing is disposed at one or both of axial end surfaces of the half bearing.

The half thrust bearing receives the axial force generated in the crankshaft. That is, the half thrust bearing is disposed for the purpose of bearing the axial force input to the crankshaft, e.g., when the crankshaft and a transmission are connected to each other by a clutch.

A thrust relief is formed on a slide surface side of the half thrust bearing in the vicinity of each circumferential end of the half thrust bearing so that a thickness of a bearing member becomes smaller toward a circumferential end surface of the half thrust bearing. Generally, a thrust relief is formed so that its length from a circumferential end surface of the half thrust bearing to a slide surface and its depth in the circumferential end surface become constant independently of radial positions. The thrust relief is formed in order to absorb misalignment of the end surfaces of the pair of half thrust bearings when the half thrust bearings are put together in a split-type bearing housing (see FIG. 10 of JP H11-201145 A).

The crankshaft of the internal combustion engine is supported, at the journal portion thereof, by the cylinder block bottom part of the internal combustion engine via the main bearing composed of the pair of half bearings. In this instance, lubrication oil is fed from an oil gallery in a cylinder block wall into a lubrication oil groove formed along an inner peripheral surface of the main bearing through a through-hole in a wall of the main bearing. The lubrication oil is supplied into the lubrication oil groove of the main bearing in this way, and then supplied to the half thrust bearing. It should be noted that a laminated structure in which a slide layer made of a bearing alloy such as an aluminum bearing alloy or copper bearing alloy is formed on one surface of a back metal layer made of an Fe alloy is generally used for the thrust bearing which receives the axial force of the crankshaft of the internal combustion engine. In a conventional half thrust bearing, a thickness of a slide layer and a thickness of a back metal layer are set to be constant in a radial direction.

In a conventional half thrust bearing (having a back metal layer and a slide layer), there has been a case that an edge portion on an inner-diameter-side of the half thrust bearing in a portion of a slide surface of the half thrust bearing adjacent to a thrust relief causes local contact (partial contact) with a thrust collar surface of a crankshaft when axial force is input from the crankshaft to the slide surface of the half thrust bearing. In order to prevent fatigue or seizure of the slide layer near the local contact part in that case, there is a suggestion in which the front and side surfaces of the back metal layer are continuously covered at least in an inner-diameter-side edge portion of the slide layer of the thrust bearing, an arc-shaped portion is provided in the continuous portion, a thin portion is formed at least in the inner-diameter-side edge portion of the back metal layer so that the thickness of the edge portion is smaller than the thickness of a radially central portion, and the slide layer becomes thicker at the thin portion than a center in the radial direction (see FIG. 4 of JP 2014-177968 A).

BRIEF SUMMARY OF THE INVENTION

Oil supplied to a slide surface of a half thrust bearing originates mainly from leakage from a crush relief clearance (a clearance between a crush relief surface and a surface of a journal portion of the crankshaft) of a main bearing (or a pair of half bearings). The half thrust bearing is designed so that the oil leaking from the crush relief clearance flows onto a thrust relief and an inner-diameter-side end surface in a part of the slide surface adjacent to the thrust relief, and then fed to the slide surface side.

When foreign matters are mixed in the oil supplied to the main bearing, the foreign matters are discharged mainly from the crush relief clearance together with the oil, and therefore tend to be fed to the thrust relief of the half thrust bearing and the inner-diameter-side end surface in the part of the slide surface adjacent to the thrust relief.

A slide layer (bearing alloy) of the half thrust bearing generally has the ability of embedding the mixed foreign matters therein. In a conventional thrust bearing, a large number of foreign matters tend to be embedded and deposited on the surface of the exposed slide layer (bearing alloy) at the thrust relief and the inner-diameter-side end surface in the part of the slide surface adjacent to the thrust relief.

Furthermore, when an inner-diameter-side edge portion in the part of the slide surface adjacent to the thrust relief of the half thrust bearing causes local contact (partial contact) with a thrust collar surface of the crankshaft as described above, a large amount of foreign matters deposited on the surface of the exposed slide layer (bearing alloy) in the inner-diameter-side end surface of the slide layer (bearing alloy) drop at once, and are fed to the surface of the thrust relief and the part of the slide layer adjacent to the thrust relief, so that seizure tends to occur in these surfaces.

Therefore, an object of the present invention is to provide a half thrust bearing and a bearing device for a crankshaft of an internal combustion engine by which local deposition of foreign matters does not easily occur and seizure does not easily occur during operation.

In order to achieve the abovementioned objected, according to one aspect of the present invention, there is provided a semi-annularly shaped half thrust bearing for receiving axial force of a crankshaft of an internal combustion engine, wherein the half thrust bearing includes a back metal layer made of an Fe alloy, and a bearing alloy layer provided on a surface of the back metal layer, the bearing alloy layer forming a slide surface which receives the axial force, the back metal layer forming a back surface parallel to the slide surface, the half thrust bearing includes two thrust reliefs formed adjacent to both circumferential end surfaces thereof, each of the thrust reliefs including a flat thrust relief surface extending between the slide surface and the circumferential end surface, so that a wall thickness of the half thrust bearing becomes smaller from a slide surface side toward a circumferential end surface side in the thrust relief, each of the thrust relief surfaces includes a first region on the circumferential end surface side that consists of a surface in which the back metal layer is exposed, and a second region on the slide surface side that consists of a surface in which the bearing alloy layer is exposed, and the slide surface includes two third regions adjacent to the second regions of the thrust relief surfaces, respectively, and a fourth region between the two third regions, so that a circumferential end region consisting of the first region, the second region and the third region is defined, a circumferential end region length (L), measured perpendicularly to a split plane (HP) of the half thrust bearing, from the split plane to a boundary between the third region and the fourth region is constant between an inner-diameter-side end surface and an outer-diameter-side end surface of the half thrust bearing, and is equivalent to a circumferential angle (θ1) between 15° at a minimum and 35° at a maximum from the split plane toward a circumferentially central side of the half thrust bearing at the inner-diameter-side end surface, in any cross-section parallel to the split plane, the bearing alloy layer in the second regions and the third regions includes a uniform thickness portion, in which a thickness of the bearing alloy layer is constant, in a range including a radial center of the half thrust bearing, and a decreased thickness portion, in which a thickness of the bearing alloy layer is smaller than the uniform thickness portion, in a range adjacent to the inner-diameter-side end surface, and in any radial cross-section including an axis of the half thrust bearing, the bearing alloy layer in the fourth region includes a uniform thickness portion, in which a thickness of the bearing alloy layer is constant, in a range including the radial center of the half thrust bearing, and an increased thickness portion, in which a thickness of the bearing alloy layer is larger than the uniform thickness portion, or the uniform thickness portion, in a range adjacent to the inner-diameter-side end surface.

According to one embodiment of the half thrust bearing of the invention, in any cross-section parallel to the split plane, the bearing alloy layer in the second regions and the third regions may further include an increased thickness portion, in which a thickness of the bearing alloy layer is larger than the uniform thickness portion, in a range adjacent to the outer-diameter-side end surface.

According to one embodiment of the half thrust bearing of the invention, a third region length (L3), measured perpendicularly to the split plane, from a boundary between the second region and the third region to the boundary between the third region and the fourth region may be 10 to 50% of the circumferential end region length (L) at the inner-diameter-side end surface.

According to one embodiment of the half thrust bearing of the invention, a second region length (L2), measured perpendicularly to the split plane, from a boundary between the first region and the second region to a boundary between the second region and the third region may be 20 to 70% of a thrust relief length (LT) from the split plane to the boundary between the second region and the third region at the inner-diameter-side end surface.

According to one embodiment of the half thrust bearing of the invention, in any radial cross-section including the axis of the half thrust bearing, the bearing alloy layer in the fourth region may further include an increased thickness portion, in which a thickness of the bearing alloy layer is larger than the uniform thickness portion, in a range adjacent to the outer-diameter-side end surface.

According to one embodiment of the half thrust bearing of the invention, a curvature center of the inner-diameter-side end surface in the circumferential end region may be at a position different from a curvature center of the inner-diameter-side end surface in the fourth region.

According to another aspect of the present invention, there is provided a bearing device for a crankshaft of an internal combustion engine, including:

a crankshaft;

a pair of half bearings for supporting a journal portion of the crankshaft, each of the half bearings including two crush reliefs formed adjacent to both circumferential end surfaces thereof on an inner-peripheral-surface side;

a bearing housing including a holding hole for holding the pair of half bearings, the holding hole being formed to penetrate the nearing housing; and at least one semi-annularly shaped half thrust bearing according to the above described one aspect of the invention, the semi-annularly shaped half bearing being arranged adjacent to the holding hole on an axial end surface of the bearing housing to receive the axial force of the crankshaft, wherein the circumferential end region length (L) is larger than a crush relief length of the crush relief at an axial end of the half bearing.

According to one embodiment of the bearing device of the invention, the circumferential end region length (L) at the inner-diameter-side end surface of the half thrust bearing may be 1.5 times or more the crush relief length at the axial end of the half bearing.

The half thrust bearing and the bearing device for a crankshaft of the present invention receive the axial force of the crankshaft of the internal combustion engine. Then, as described above, in the half thrust bearing for the crankshaft, lubrication oil including foreign matters is supplied to the thrust relief surface and the inner-diameter-side end surface in a part of the slide surface adjacent to the thrust relief. However, according to the present invention, the bearing alloy layer in each of the second region of the thrust relief surface and the third region in the slide surface includes, in any cross-section parallel to the split plane of the half thrust bearing, the uniform thickness portion in which the thickness of the bearing alloy layer is constant, in a range including a radial center of the half thrust bearing, and the decreased thickness portion in which the thickness of the bearing alloy layer is smaller than the uniform thickness portion, in a range adjacent to the inner-diameter-side end surface of the half thrust bearing, so that the ratio of the bearing alloy layer exposed to the inner-diameter-side end surface in each of the second region and the third regions is low. Thus, a large number of foreign matters are not easily deposited on the surface of the bearing alloy layer on the inner-diameter-side end surface of each of the second region and the third regions to which the lubrication oil including the foreign matters is supplied, and also, a large number of foreign matters do not drop and are not fed to the thrust relief surface and the slide surface adjacent to the thrust relief, so that seizure does not easily occur on these surfaces.

DESCRIPTION OF THE EMBODIMENTS

Hereinafter, embodiments of the present invention will be described with reference to the drawings.

Example 1

(Overall Configuration of Bearing Device)

Figure 1:
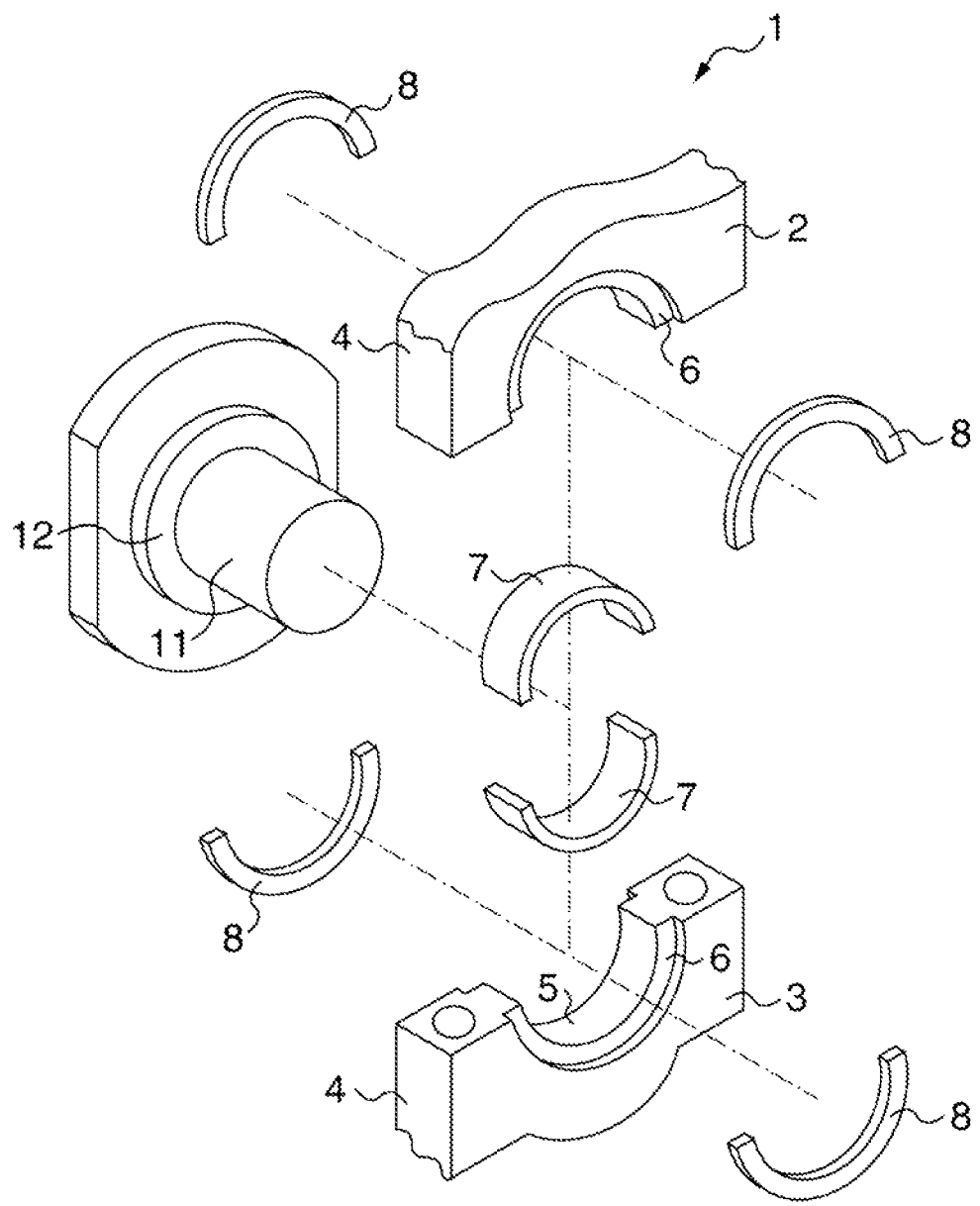
FIG. 1 is an exploded perspective view of a bearing device.
Figure 2:
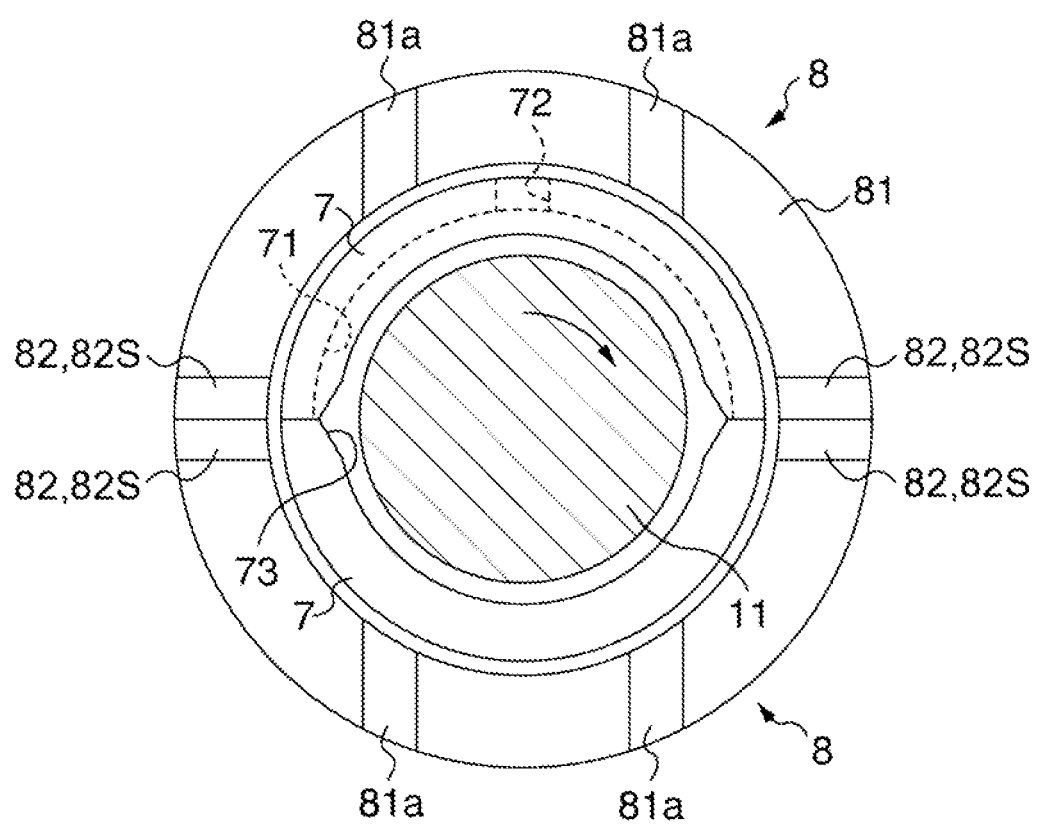
FIG. 2 is a front view of the bearing device.
Figure 3:
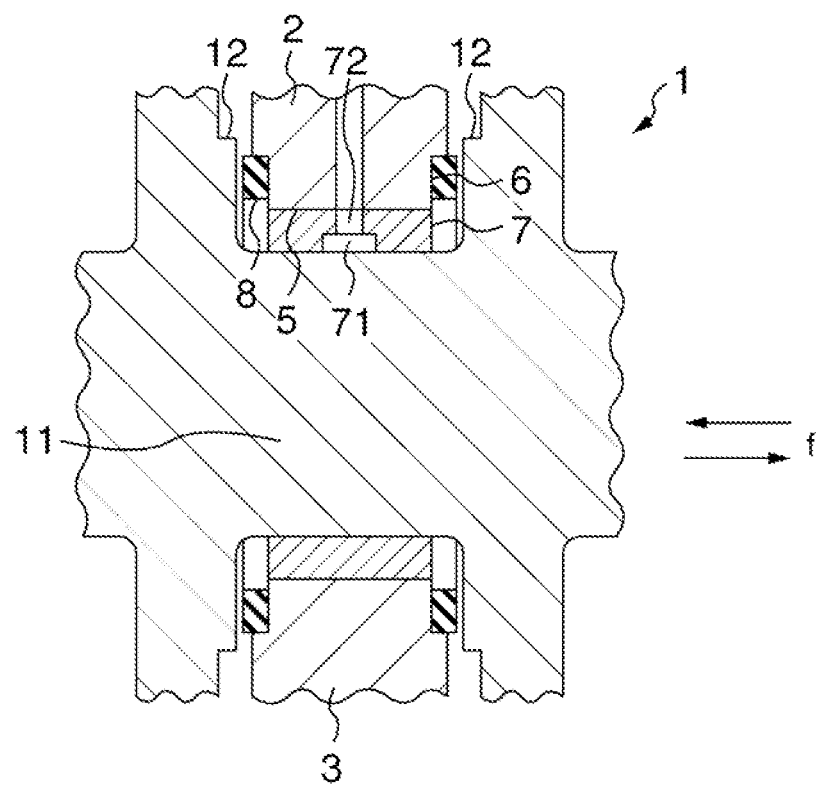
FIG. 3 is an axially cross-sectional view of the bearing device.

Firstly, the overall configuration of a bearing device 1 according to Example 1 of the present invention will be described using FIGS. 1 to 3. As illustrated in FIGS. 1 to 3, a bearing hole (holding hole) 5 which is a circular hole penetrating between both side surfaces is formed in a bearing housing 4 configured by mounting a bearing cap 3 onto a lower portion of a cylinder block 2, and receiving seats 6, 6 which are circular-ring-shaped recesses are formed on a peripheral edge of the bearing hole 5 on a side surface. Half bearings 7, 7 which rotatably bear a journal portion 11 of a crankshaft are combined into a cylindrical shape and fitted into the bearing hole 5. Half thrust bearings 8, 8 which receive axial force f (see FIG. 3) via a thrust collar 12 of the crankshaft are combined into a circular ring shape and fitted into the receiving seats 6, 6.

As illustrated in FIGS. 2 to 5, the half bearing 7 on the cylinder block 2 side (upper side) of the half bearings 7 constituting a main bearing has a lubrication oil groove 71 formed in an inner peripheral surface thereof, and a through-hole 72 formed in the lubrication oil groove 71 to penetrate to an outer peripheral surface thereof. Note that the lubrication oil groove 71 may be formed in each of both upper and lower half bearings.

Furthermore, in the half bearing 7, crush reliefs 73, 73 are formed, at both circumferential end portions thereof, adjacent to contact surfaces of the half bearings 7. The crush relief 73 is a wall thickness decreasing region in which a wall thickness of a region adjacent to a circumferential end surface of the half bearing 7 is formed so as to become gradually smaller toward the circumferential end surface. The crush relief 73 is formed with the intention of absorbing misalignment and deformation of abutment surfaces when a pair of the half bearings 7, 7 are assembled.

(Configuration of Half Thrust Bearing)

Next, the configuration of the half thrust bearing 8 according to Example 1 will be described using FIGS. 2, 3, 6, and 7.

As illustrated in FIG. 2, the half thrust bearing 8 according to the present example includes a slide surface 81 (bearing surface) which extends in a range including a circumferential center and receives the axial force f, and two thrust reliefs 82, 82 formed in regions adjacent to both circumferential end surfaces 83, 83, and the thrust relief 82 includes a flat thrust relief surface (plane) 82S. In order to enhance oil retaining property of lubrication oil, two oil grooves 81a, 81a are formed on the slide surface 81 between the thrust reliefs 82, 82 located on both sides.

Figure 8:
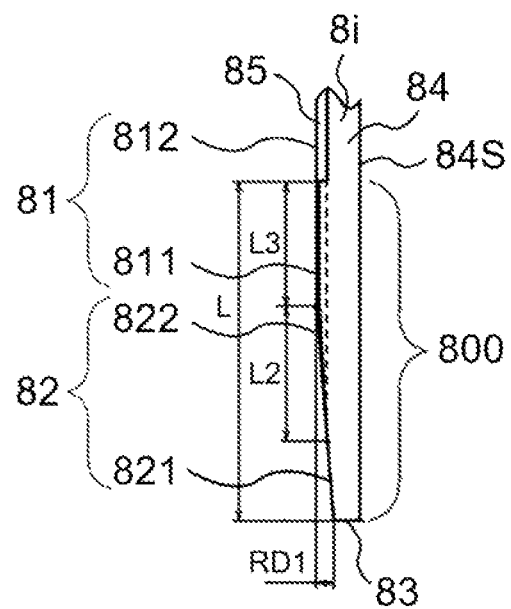
FIG. 8 is an enlarged side view in which the vicinity of the circumferential end of the half thrust bearing according to Example 1 is seen from an inner side (in a direction viewed along the arrow Y1 in FIG. 7)

The thrust relief 82 is a wall thickness decreasing region formed over the entire radial length of the half thrust bearing 8, in a region on the slide surface 81 side adjacent to both circumferential end surfaces 83, so that a wall thickness of the half thrust bearing 8 gradually becomes smaller toward the circumferential end surface 83 (see also FIG. 8). The thrust relief 82 is formed to ease misalignment of both circumferential end surfaces 83, 83 of a pair of the half thrust bearings 8, 8 that may occur when the half thrust bearing 8 is assembled in the divided-type bearing housing 4.

Figure 6:
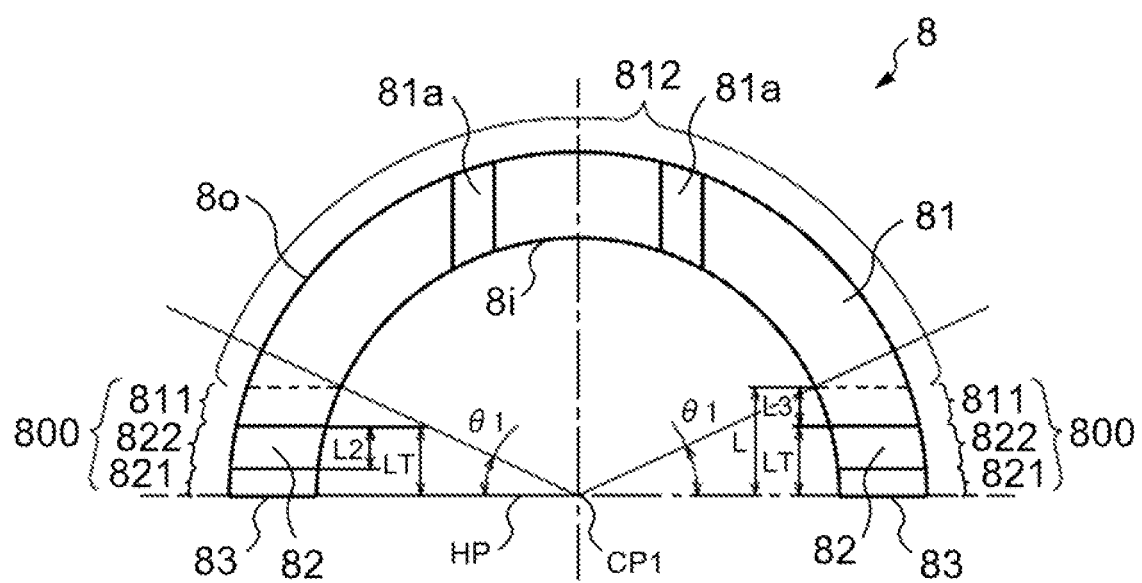
FIG. 6 is a front view of a half thrust bearing according to Example 1.
Figure 7:
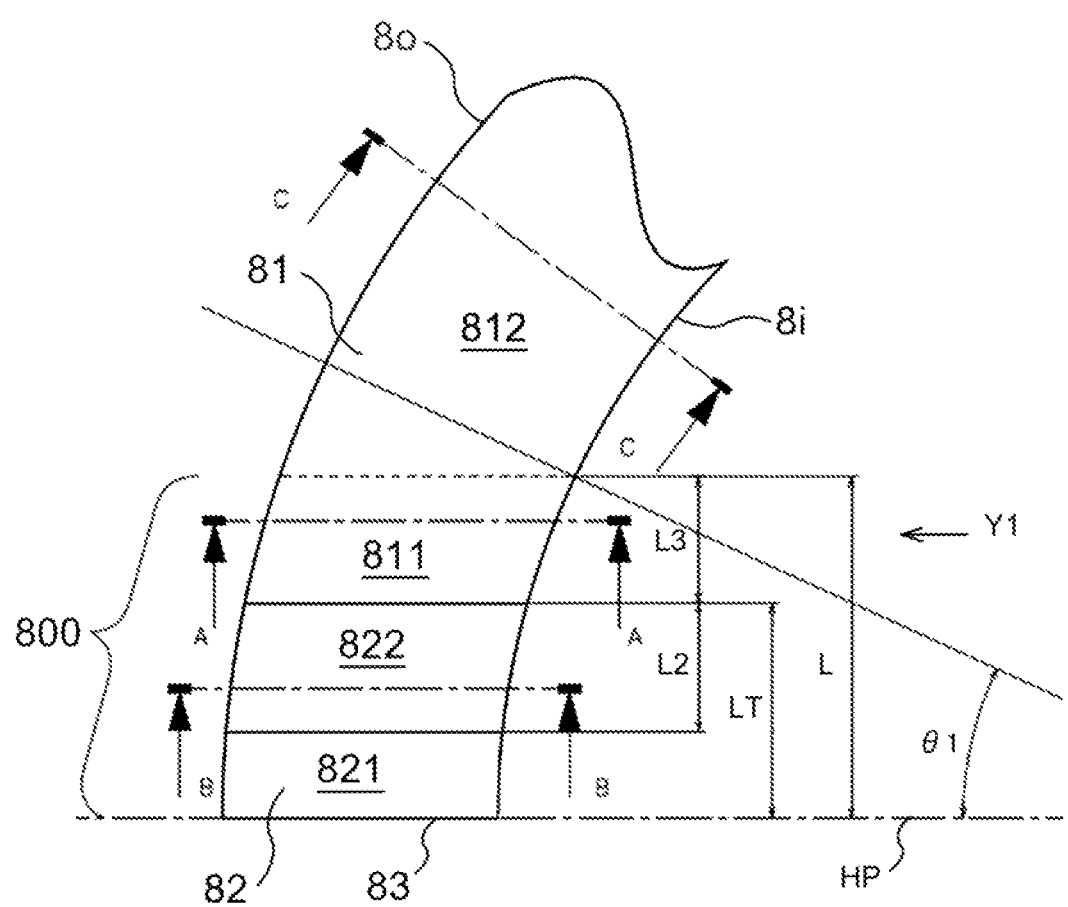
FIG. 7 is an enlarged front view of the vicinity of a circumferential end of the half thrust bearing according to Example 1.

As illustrated in FIGS. 6 and 7, the thrust relief 82 according to the present example has a thrust relief length LT which is constant between an inner-diameter-side end surface 8$i$ and an outer-diameter-side end surface 8$o$ of the half thrust bearing 8.

The thrust relief surface 82S of the thrust relief 82 includes a first region 821 consisting of a surface in which a back metal layer 84 is exposed, on the circumferential end surface 83 side of the half thrust bearing 8, and a second region 822 consisting of a surface in which a bearing alloy layer 85 is exposed, adjacent to the first region 821 on a circumferentially central side. The first region 821 and the second region 822 extend flush (or in the same plane), and thereby constitute the flat thrust relief surface 82S.

Particularly in case of using a crankshaft of a small internal combustion engine such as a passenger vehicle (a diameter of a journal portion is about 30 to 100 mm), the thrust relief length LT from the circumferential end surface 83 of the half thrust bearing 8 is 3 to 10 mm.

A second region length L2 of the second region 822 defined as a length from a boundary between the first region 821 and the second region 822 to a boundary between the second region 822 and the slide surface 81 is preferably 20 to 70% of the thrust relief length LT (i.e., L2/LT=0.2 to 0.7) at the inner-diameter-side end surface 8*i* of the half thrust bearing 8.

Here, the thrust relief length LT of the thrust relief 82 is defined as a length from a plane including a central axis CP1 of the half thrust bearing 8 to become a symmetry plane when a pair of the half thrust bearings are mounted (hereinafter, referred to as a split plane HP), to a boundary between the thrust relief surface 82S and the slide surface 81, that is measured perpendicularly to the split plane HP. In the present example, since both circumferential end surfaces 83 are located in the split plane HP, the thrust relief length LT at the inner-diameter-side end surface 8*i* can be defined as a perpendicular length from the circumferential end surface 83 to a point where the thrust relief surface 82S intersects an inner peripheral edge of the slide surface 81. It will be appreciated that the second region length L2 of the thrust relief 82 is also defined as a length measured in a direction perpendicular to the split plane HP.

As illustrated in FIG. 8, the thrust relief 82 of the half thrust bearing 8 is formed so as to have an axial depth RD1 which is constant between the inner-diameter-side end surface 8*i* and the outer-diameter-side end surface 8*o* of the half thrust bearing 8 in the circumferential end surface 83. The axial depth RD1 of the thrust relief 82 may be 0.1 to 1 mm.

Here, the axial depth of the thrust relief 82 means an axial distance from a plane including the slide surface 81 of the half thrust bearing 8 to the thrust relief surface 82S. In other words, the axial depth of the thrust relief 82 is a distance perpendicularly measured from a virtual slide surface which is an extension of the slide surface 81 over the thrust relief 82, to the thrust relief surface 82S. Therefore, the axial depth RD1 of the thrust relief 82 in the circumferential end surface 83 of the half thrust bearing 8 is defined as a distance from the virtual slide surface which is the extension of the slide surface 81 to the intersection of the thrust relief surface 82S and the circumferential end surface 83.

The half thrust bearing 8 is formed as a semi-annularly shaped flat plate from bimetal in which the thin bearing alloy layer 8 is adhered to the back metal layer 84 made of an Fe alloy. A Cu bearing alloy, an Al bearing alloy, or the like may be used for the bearing alloy layer 85 forming the slide surface 81, and steel, stainless steel, or the like may be used as an Fe alloy of the back metal layer 84.

The back metal layer 84 forms, opposite to the slide surface 81, a back surface 84S of the half thrust bearing 8 parallel to the slide surface 81.

As illustrated in FIGS. 6 and 7, the slide surface 81 of the half thrust bearing 8 includes two third regions 811 each adjacent to the second region 822 of each thrust relief surface 82S, and a fourth region 812 including a circumferential center of the half thrust bearing 8 and extending between the two third regions 811.

A circumferential end region 800 is configured on each circumferential side of the half thrust bearing 8, by the first region 821 and the second region 822 of the thrust relief surface 82S, and the third regions 811 of the slide surface 81. The circumferential end region 800 has a circumferential end region length L which is a length, measured perpendicularly to the split plane HP, from the circumferential end surface 83 to a boundary between the third region 811 and the fourth region 812, and the circumferential end region length L is a length which is constant between the inner-diameter-side end surface 8*i* and the outer-diameter-side end surface 8*o* of the half thrust bearing 8, and is equivalent to a circumferential angle (θ1) between 15° at a minimum and 35° at a maximum from the split plane HP toward the circumferentially central side of the half thrust bearing, at the inner-diameter-side end surface 8*i*.

As appreciated, the circumferential end region length L is larger than the thrust relief length LT at the inner-diameter-side end surface 8*i* of the half thrust bearing 8. Preferably, a third region length L3 of the third regions 811 of the slide surface 81 is 10 to 50% of the circumferential end region length L (L3/L=0.1 to 0.5) at the inner-diameter-side end surface 8*i* of the half thrust bearing 8. Here, the third region length L3 at the inner-diameter-side end surface 8*i* is defined as a length, measured perpendicularly to the split plane HP, from a boundary between the second region 822 and the third regions 811 to a boundary between the third regions 811 and the fourth region 812.

The arrangement of the back metal layer 84 and the bearing alloy layer 85 of the half thrust bearing 8 will be described below with reference to FIGS. 7 to 11.

Figure 9:
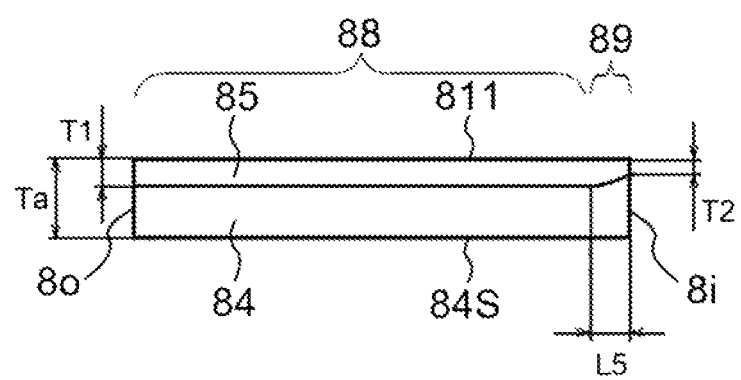
FIG. 9 is an A-A cross-sectional view of FIG. 7.

As appreciated from FIG. 9 illustrating an A-A cross-section in FIG. 7, the bearing alloy layer 85 in the third region 811 includes, in a cross-section parallel to the split plane HP, a uniform thickness portion 88 which extends in a range including a radial center and whose axial thickness T1 is constant, and a decreased thickness portion 89 which is adjacent to the inner-diameter-side end surface 8*i* and whose axial thickness T2 is smaller than the thickness T1 of the uniform thickness portion 88, in a range adjacent to the inner-diameter-side end surface. More specifically, the thickness T2 of the decreased thickness portion 89 continuously decreases from the uniform thickness portion 88 toward the inner-diameter-side end surface 8*i*. In addition, in this cross-section, an axial thickness Ta of the half thrust bearing 8 is constant.

Figure 10:
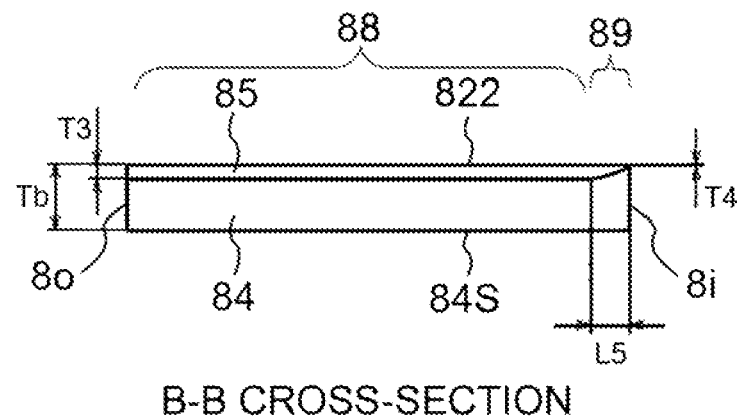
FIG. 10 is a B-B cross-sectional view of FIG. 7.

Moreover, as appreciated from FIG. 10 illustrating a B-B cross-section in FIG. 7, the bearing alloy layer 85 in the second region 822 includes, in a cross-section parallel to the split plane HP, the uniform thickness portion 88 which extends in a range including a radial center and whose axial thickness T3 is constant, and the decreased thickness portion 89 which is adjacent to the inner-diameter-side end surface 8*i* and whose axial thickness T4 is smaller than the thickness T3 of the uniform thickness portion 88. More specifically, the thickness T4 of the decreased thickness portion 89 continuously decreases from the uniform thickness portion 88 toward the inner-diameter-side end surface 8*i*. In addition, in this cross-section as well, an axial thickness Tb of the half thrust bearing 8 is constant.

Figure 11:
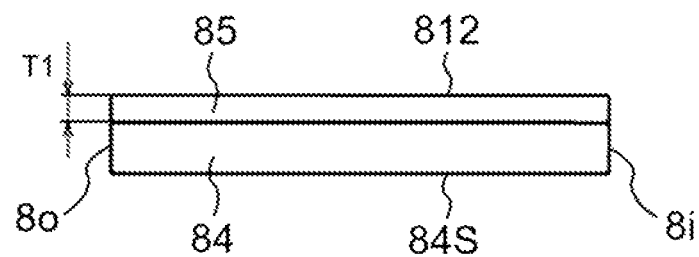
FIG. 11 is a C-C cross-sectional view of FIG. 7.

Furthermore, as appreciated from FIG. 11 illustrating a C-C cross-section in FIG. 7, the bearing alloy layer 85 in the fourth region 812 includes, in a radial cross-section including the axis of the half thrust bearing 8, only the uniform thickness portion 88 whose axial thickness T1 is constant. In addition, the axial thickness T1 of the uniform thickness portion 88 of the bearing alloy layer 85 is preferably 0.2 to 0.5 mm. A length L5 perpendicular to the axial direction, of the decreased thickness portion 89 in each of the second region 822 and the third region 811 is preferably 0.2 to 1 mm.

FIG. 8 is a side view in which the vicinity of the circumferential end region 800 of the half thrust bearing 8 is seen from an inner diameter side (in a direction viewed along the arrow Y1 in FIG. 7).

A dotted line drawn in the circumferential end region 800 represents a plane in which the bearing alloy layer 85 is in contact with the back metal layer 84 in the uniform thickness portion 88, i.e., a boundary between the bearing alloy layer 85 and the back metal layer 84 when the decreased thickness portion 89 is not formed in the bearing alloy layer 85. The ratio of the area of the back metal layer 84 on the inner-diameter-side end surface 8i of the circumferential end region 800 is lower than the case when the decreased thickness portion 89 is not formed.

The thickness T2 of the decreased thickness portion 89 of the bearing alloy layer 85 on the inner-diameter-side end surface 8i in the third region 811 of the circumferential end region 800 is preferably equal to or more than 10% (but not more than 50%) of the thickness T1 of the uniform thickness portion 88 of the bearing alloy layer 85. The thickness T2 of the decreased thickness portion 89 of the bearing alloy layer 85 on the inner-diameter-side end surface 8i in the third region 811 is equal to or more than 10% of the thickness T1 of the uniform thickness portion 88 of the bearing alloy layer 85, by which direct contact is prevented between the back metal layer 84 of the half thrust bearing 8 and the surface of the thrust collar 12 of the crankshaft.

Note that an overlay layer may be formed on the slide surface 81 of the bearing alloy layer 85 of the half thrust bearing 8. Metals or alloys such as Sn, an Sn alloy, Bi, a Bi alloy, Pb, and a Pb alloy, or a resin sliding material can be used as the overlay layer. The resin sliding material is formed of a resin binder and a solid lubricant. Commonly-known resin can be used as the resin binder, but the use of one or more kinds of high heat-resistant polyamide-imide, polyimide, and polybenzimidazole is preferable. Moreover, a resin composition in which high heat-resistant resin consisting of one or more kinds of polyamide-imide, polyimide, and polybenzimidazole is mixed with 1 to 25 volume percent of resin consisting of one or more kinds of polyamide, epoxy, and polyethersulfone, or a polymer-alloyed resin composition may be used as the resin binder. Molybdenum disulfide, tungsten disulfide, graphite, polytetrafluoroethylene, boron nitride, or the like can be used as the solid lubricant. The addition rate of the solid lubricant to the resin sliding material is preferably 20 to 80 volume percent. Moreover, in order to enhance wear resistance of the resin sliding material, 0.1 to 10 volume percent of hard particles of ceramics, an intermetallic compound, or the like may be contained in the resin sliding material.

The overlay layer may be added not only to the slide surface 81 of the bearing alloy layer 85 which receives the axial force f of the crankshaft, but also to the thrust relief surface 82S of the thrust relief 82, the surface of the oil groove 81a, the inner-diameter-side end surface 8i, the outer-diameter-side end surface 8o, the back surface 84S, the circumferential end surface 83 of the half thrust bearing 8, and the like. The thickness of an overlay layer 82b is 0.5 to 20 μm, preferably 1 to 10 pin.

Note that, in this specification, the slide surface 81, the thrust relief surface 82S, the inner-diameter-side end surface 8i, the outer-diameter-side end surface 8o, the back surface 84S, and the circumferential end surface 83 are defined as those in the case that the overlay layer 82b is not added.

(Effects)

Next, the effects of the thrust bearing 10 according to the present example will be described using FIGS. 2, 3, 12A, and 12B.

In the bearing device 1, lubrication oil which is pressurized and discharged from an oil pump (not illustrated) is supplied to the lubrication oil groove 71 on the inner peripheral surface of the half bearing 7 through the through-hole 72 penetrating the wall of the half bearing 7 from an internal oil path in the cylinder block 2. Foreign matters may be mixed in the lubrication oil supplied into the lubrication oil groove 71. A part of the lubrication oil is supplied to the inner peripheral surface of the half bearing 7, another part is fed to a crankpin side through an opening (not illustrated) to an internal oil path of the crankshaft that is provided in the surface of the journal portion 11, and yet another part flows out from both axial ends of each of the half bearings 7, 7 through a clearance between a surface of the crush relief 73 of each of a pair of the half bearings 7, 7 constituting the main bearing, and a surface of the journal portion 11 of the crankshaft.

In the present example, the half bearing 7 is arranged concentrically with the half thrust bearing 8, a plane including both circumferential end surfaces of the half bearing 7 constituting the main bearing is aligned with a plane including both circumferential end surfaces of the half thrust bearing 8, and therefore the positions of the crush reliefs 73 correspond to the positions of the thrust reliefs 82.

The effects of the present invention will be described below.

Figure 12A:
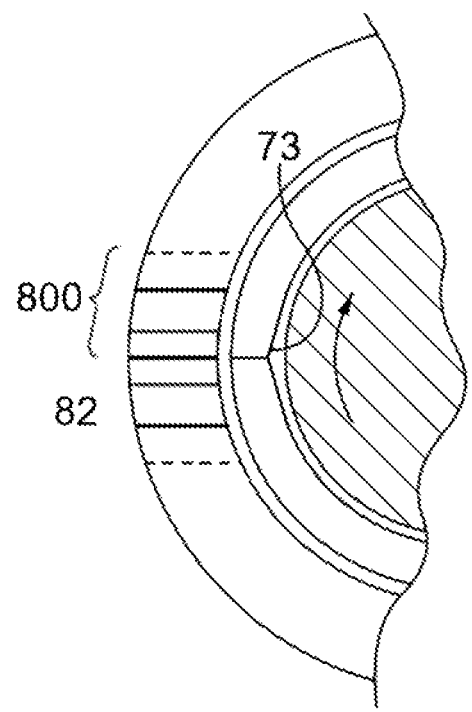
FIG. 12A is a front view of a half bearing and a half thrust bearing for explanation of advantageous effects of the embodiment.
Figure 12B:
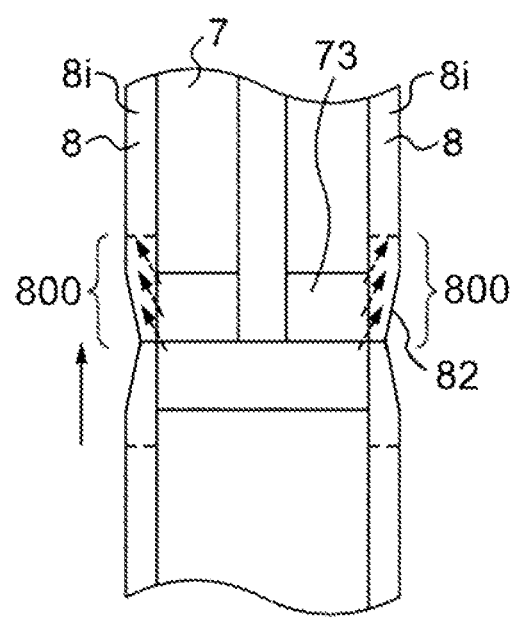
FIG. 12B is a view illustrating an inner surface in which the half bearing and the thrust bearing in FIG. 12A are seen from a radially inner side.

Immediately after flowing out from the crush relief clearance of the half bearing 7, the lubrication oil including the foreign matters circumferentially flows along the surface of the journal portion 11 of the rotating crankshaft, and therefore flows toward a forward side of a rotation direction of the crankshaft from the position of an abutment portion (contact portion) between the circumferential end surface 83 of one of the half thrust bearings 8 and the circumferential end surface 83 of the other half thrust bearing 8 due to inertial force which causes the oil to move to the forward side of the rotation direction of the crankshaft, as illustrated in FIGS. 12A and 12B (see the broken arrows in FIGS. 12A and 12B).

The half thrust bearing 8 according to the present example includes the circumferential end region 800 consisting of the thrust relief surface 82S consisting of the first region 821 and the second region 822, and the third region 811 adjacent to the thrust relief surface 82S. Each of the second region 822 and the third region 811 of the circumferential end region 800 includes, in a cross-section parallel to the split plane HP of the half thrust bearing 8, the uniform thickness portion 88 which extends in a range including a radial center and in which the axial thickness T1 is constant, and the decreased thickness portion 89 which is adjacent to the inner-diameter-side end surface 8i and in which the axial thickness T2 is smaller than the axial thickness T1 of the uniform thickness portion 88.

Therefore, in the half thrust bearing 8 of the present invention, the ratio of the bearing alloy layer 85 which tends to embed the foreign matters therein is low (i.e., the ratio of the back metal layer 84 which does not easily embed the foreign matters therein is high) on the inner-diameter-side end surface 8i of the circumferential end region 800 to which the lubrication oil including foreign matters flows. Thus, a large amount of foreign matters are not easily deposited on the surface (side surface) of the bearing alloy layer 85 on the inner-diameter-side end surface 8i of the circumferential end region 800, and a large amount of deposited foreign matters do not drop from the surface (side surface) of the bearing alloy layer 85 and are not fed to the thrust relief 82 and the slide surface 81 adjacent to the thrust relief 82, so that seizure does not easily occur on the thrust relief surfaces 82S and the slide surface 81.

During operation of the internal combustion engine, (axial) bending occurs in the crankshaft, and vibration of the crankshaft increases, particularly in an operation condition where the crankshaft rotates at high speed. Due to this great vibration, there is a case where the fourth region 812 located in the circumferential center of the half thrust bearing 8, a part of the slide surface 81 adjacent to the outer-diameter-side end surface 8o of the circumferential end region 800, and a part of the slide surface 81 adjacent to the inner-diameter-side end surface 8*i* of the fourth region 812 repeatedly make local contact with the surface of the thrust collar 12 of the crankshaft. However, the bearing alloy layer 85 in these parts does not include the decreased thickness portion 89 (but includes the uniform thickness portion 88), and has sufficient thickness, and therefore the load resulting from the local contact with the surface of the thrust collar 12 is eased by elastic deformation of the soft bearing alloy layer 85.

Example 2

Figure 13:
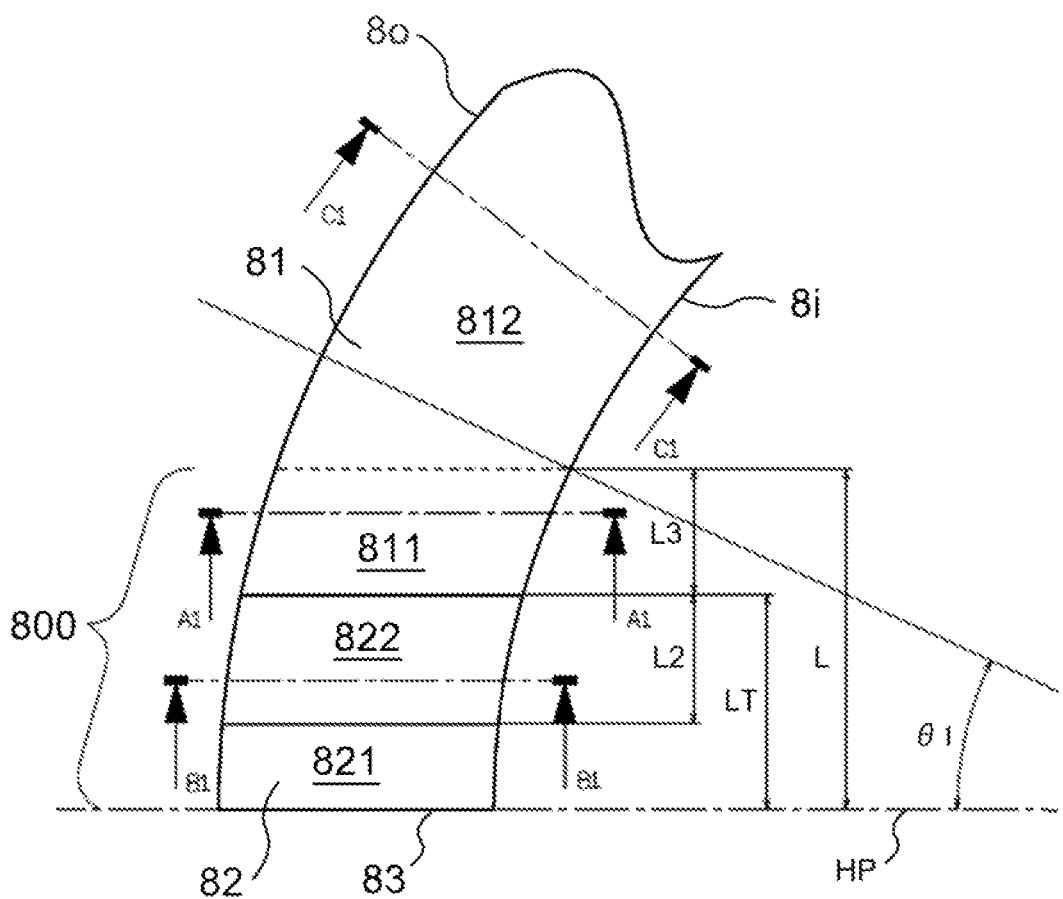
FIG. 13 is an enlarged front view of the vicinity of a circumferential end of a half thrust bearing according to Example 2.
Figure 14:
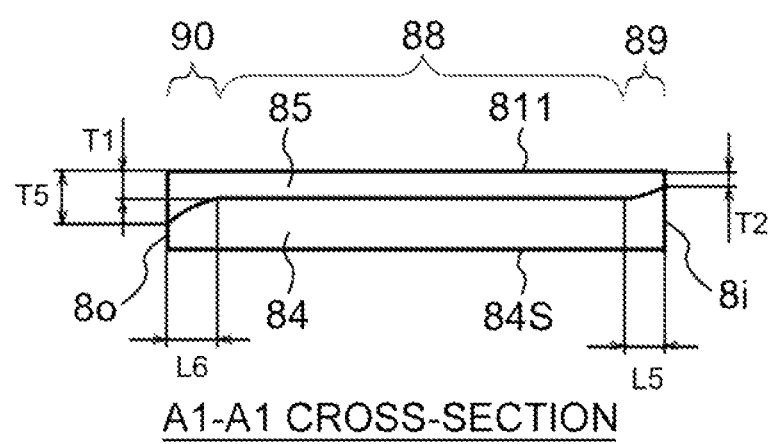
FIG. 14 is an A1-A1 cross-sectional view of FIG. 13.
Figure 15:
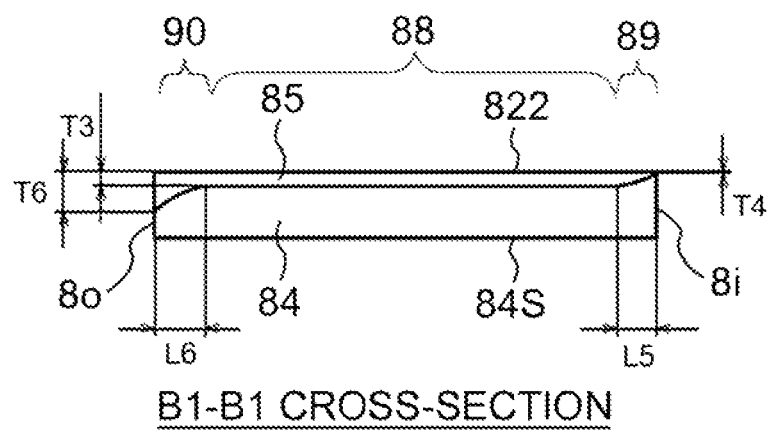
FIG. 15 is a B1-B1 cross-sectional view of FIG. 13.
Figure 16:
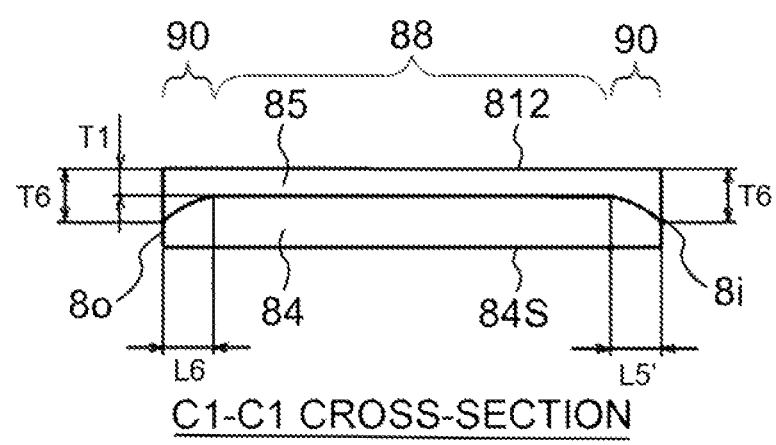
FIG. 16 is a C1-C1 cross-sectional view of FIG. 13.

A half thrust bearing 8 including a fourth region 812 and a circumferential end region 800 in a form different from Example 1 with respect to a bearing alloy layer 85 will be described below using FIGS. 13 to 16. Note that parts which are the same as or equivalent to the contents described in Example 1 are described with the same reference signs. FIG. 13 is an enlarged front view of the vicinity of the circumferential end of the half thrust bearing 8 according to Example 2. FIG. 14 illustrates an A1-A1 cross-section in FIG. 13. FIG. 15 illustrates a B1-B1 cross-section in FIG. 13. FIG. 16 illustrates a C1-C1 cross-section in FIG. 13.
(Configuration)

Firstly, a configuration is described. The configuration of the half thrust bearing 8 according to the present example is substantially similar to that of Example 1 except for the shape (thickness) of the bearing alloy layer 85 in the cross-sections described above.

Specifically, the bearing alloy layer 85 in the third region 811 of the circumferential end region 800 of the half thrust bearing 8 according to the present example includes, in a cross-section parallel to a split plane HP, a uniform thickness portion 88 which extends in a range including a radial center and whose axial thickness T1 is constant, a decreased thickness portion 89 which is adjacent to an inner-diameter-side end surface 8*i* and whose axial thickness T2 is smaller than the thickness of the uniform thickness portion 88, and an increased thickness portion 90 which is adjacent to an outer-diameter-side end surface 8*o* and whose axial thickness T5 is larger than the thickness T1 of the uniform thickness portion 88. The bearing alloy layer 85 continuously increases in axial thickness in the increased thickness portion 90 from the side contacting the uniform thickness portion 88 toward the outer-diameter-side end surface 8*o* (see FIG. 14).

The bearing alloy layer 85 in a second region 822 of the circumferential end region 800 includes, in a cross-section parallel to a split plane HP, the uniform thickness portion 88 which extends in a range including a radial center and whose axial thickness T3 is constant, the decreased thickness portion 89 which is adjacent to the inner-diameter-side end surface 8*i* and whose axial thickness T4 is smaller than the thickness T3 of the uniform thickness portion 88, and the increased thickness portion 90 which is adjacent to the outer-diameter-side end surface 8*o* and whose axial thickness T6 is larger than the thickness T3 of the uniform thickness portion 88. The bearing alloy layer 85 continuously increases in thickness in the increased thickness portion 90 from the side contacting the uniform thickness portion 88 toward the outer-diameter-side end surface 8*o* (see FIG. 15). Note that a length L6 perpendicular to the axial direction, of the increased thickness portion 90 in each of the second region 822 and the third region 811 is preferably 0.2 to 1 mm.

Further, the bearing alloy layer 85 in the fourth region 812 located in the circumferential center of the half thrust bearing 8 includes, in a radial cross-section including the axis of the half thrust bearing 8, the uniform thickness portion 88 which includes a radial center and whose axial thickness T1 is constant, the increased thickness portion 90 which is adjacent to the inner-diameter-side end surface 8*i* and whose axial thickness T6 is larger than the thickness T1 of the uniform thickness portion 88, and the increased thickness portion 90 which is adjacent to the outer-diameter-side end surface 8*o* and whose axial thickness T6 is larger than that of the uniform thickness portion 88. The bearing alloy layer 85 continuously increases in thickness in these increased thickness portions 90 from the side contacting the uniform thickness portion 88 toward the inner-diameter-side end surface 8*i* or the outer-diameter-side end surface 8*o* (see FIG. 16). In addition, the length L6 of the increased thickness portion adjacent to the outer-diameter-side end surface 8*o* and a length L5' of the increased thickness portion adjacent to the inner-diameter-side end surface 8*i* are each preferably 0.2 to 1 mm in a radial cross-section.

The configuration in which the bearing alloy layer 85 in each of the second region 822 and the third region 811 of the circumferential end region 800 according to Example 2 includes the decreased thickness portion 89 adjacent to the inner-diameter-side end surface 8*i* is similar to that in Example 1, and therefore Example 2 has an effect of preventing the deposition of foreign matters as with the case of Example 1.

Further, in Example 2, the bearing alloy layer 85 in the fourth region 812 of the half thrust bearing 8 includes the increased thickness portions 90, 90 adjacent to the inner-diameter-side end surface 8*i* and the outer-diameter-side end surface 8*o*, respectively, and the bearing alloy layer 85 of the circumferential end region 800 includes the increased thickness portion 90 adjacent to the outer-diameter-side end surface 80. Therefore, this half thrust bearing 8 has a high effect of easing the load resulting from local contact between a part of the slide surface 81 adjacent to the inner-diameter-side end surface 8*i* or the outer-diameter-side end surface 8*o* and the surface of the thrust collar 12 when the (axial) bending occurs in the crankshaft, and vibration of the crankshaft increases.

Note that the bearing alloy layer 85 in the fourth region 812 of the half thrust bearing 8 includes the increased thickness portions 90, 90 adjacent to the inner-diameter-side end surface 8*i* and the outer-diameter-side end surface 8*o*, respectively, in the present example, but may include only he increased thickness portion 90 adjacent to the outer-diameter-side end surface 8*o*, or only the increased thickness portion 90 adjacent to the inner-diameter-side end surface 8*i* (in this case, the bearing alloy layer 85 does not include the increased thickness portion 90 adjacent to the outer-diameter-side end surface 8*o* of the circumferential end region 800 either).

Example 3

Figure 17:
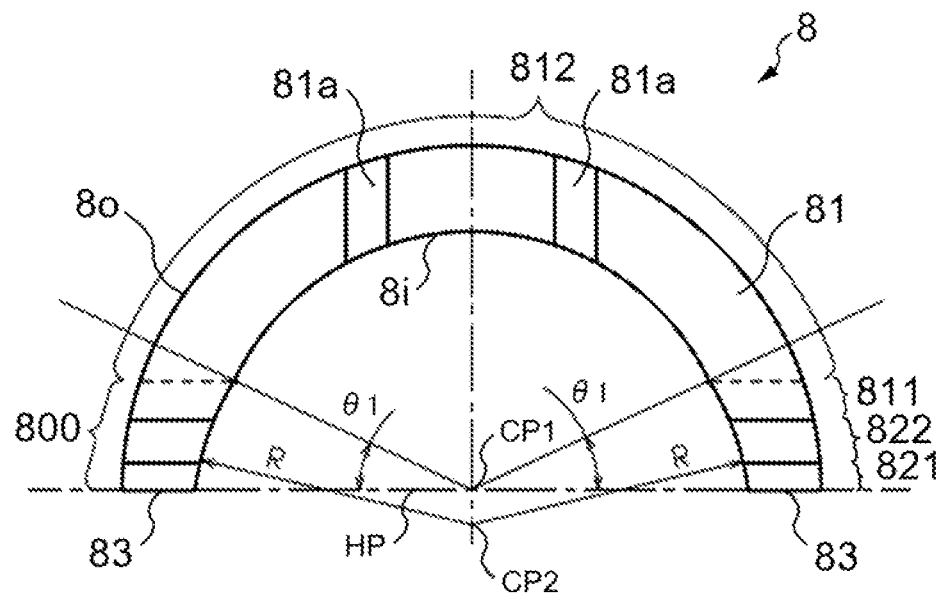
FIG. 17 is a front view of a half thrust bearing according to Example 3.

A half thrust bearing 8 including an inner-diameter-side end surface 8*i* of a circumferential end region 800 in a form different from Example 1 will be described below using FIG. 17. Note that parts which are the same as or equivalent to the contents described in Example 1 are described with the same reference signs. FIG. 17 is a front view of a half thrust bearing 8 according to Example 3.
(Configuration)

Firstly, the configuration is described. The configuration of the half thrust bearing 8 according to the present example is substantially similar to that in Example 1 except for the inner-diameter-side end surface 8*i* in the circumferential end region 800.

Specifically, a curvature center CP2 of the inner-diameter-side end surface 8*i* of each of the circumferential end regions 800 of the half thrust bearing 8 in the present example is shifted from a curvature center CP1 of the inner-diameter-side end surface 8*i* (or a curvature center of an outer-diameter-side end surface 8*o*) in a fourth region 812 located in the circumferential center of the half thrust bearing 8.

The configuration in which the bearing alloy layer 85 in each of the second region 822 and the third region 811 of the circumferential end region 800 according to Example 3 includes the decreased thickness portion 89 adjacent to the inner-diameter-side end surface 8*i* is similar to that in Example 1, and therefore Example 3 has the effect of preventing the deposition of foreign matters as in Example 1.

Example 4

Next, a bearing device 1 including the thrust bearing according to the invention is will be described using FIGS. 2 to 8, 12A, and 12B. Note that parts which are the same as or equivalent to the contents described in the above examples are described with the same reference signs.

In the present example, although the bearing device 1 including the half thrust bearing 8 described in Example 1 is described, the present invention is not limited thereto, and it should be noted that even the bearing device 1 including the half thrust bearing 8 according to each of Examples 2 and 3 also brings about an effect similar to the following.

As illustrated in FIGS. 1 to 3, the bearing device 1 according to the present example includes the bearing housing 4 having the cylinder block 2 and the bearing cap 3, the two half bearings 7, 7 which rotatably bear the journal portion 11 of the crankshaft, and the four half thrust bearings 8 which receive axial force via the thrust collar 12 of the crankshaft.

The bearing hole 5 as a holding hole which holds a pair of the half bearings 7, 7 is formed to penetrate the cylinder block 2 and the bearing cap 3 constituting the bearing housing 4, at the connection positions thereof.

Figure 4:
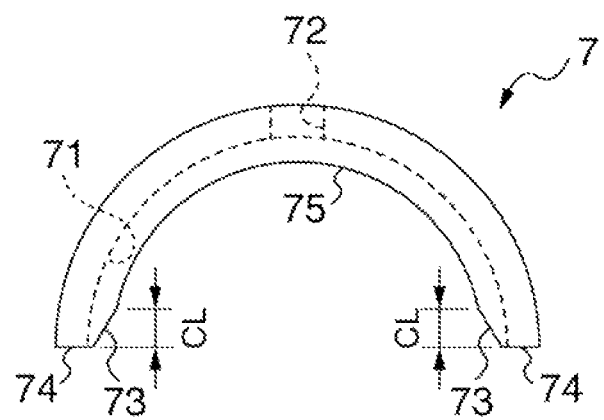
FIG. 4 is a front view of a half bearing.
Figure 5:
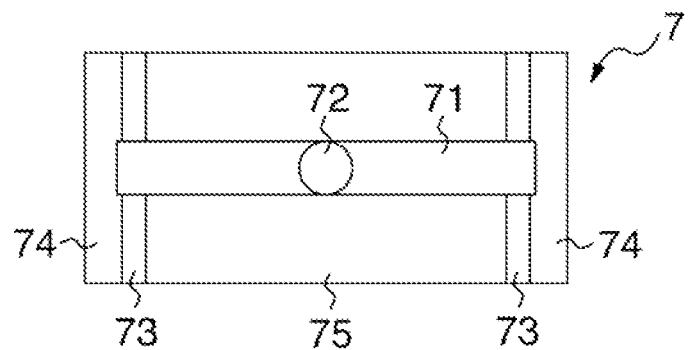
FIG. 5 is a bottom view in which the half bearing illustrated in FIG. 4 is seen from a radially inner side.

Each of the half bearings 7 includes the crush reliefs 73, 73 formed adjacent to both circumferential ends of the inner peripheral surface. Moreover, the half bearing 7 arranged on the side of the cylinder block 2 includes the lubrication oil groove 71 formed along the circumferential direction in the vicinity of the center of the width direction (axial direction) of the bearing as illustrated in FIGS. 4 and 5, and the through-hole 72 penetrating from the inner-peripheral-surface side lubrication oil groove 71 to the outer peripheral surface.

A pair of the half thrust bearings 8, 8 are provided on the respective axial sides of a pair of the half bearings 7, 7. Each of the half thrust bearings 8 is formed into a semi-annular shape, and the outer diameter of the half bearing 7 and the outer diameter of the half thrust bearing 8 are arranged substantially concentrically. Moreover, a horizontal plane passing through both circumferential end surfaces of the half bearing 7 and a horizontal plane (split plane HP) passing through both circumferential end surfaces of the half thrust bearing 8 are arranged so as to correspond to or to be substantially parallel to each other.

Therefore, as illustrated in FIG. 2, the crush relief 73 of the half bearing 7 and a thrust relief 82 of the half thrust bearing 8 are located to correspond one to one.

As described in Example 1, each of the half thrust bearings 8 has the circumferential end regions 800 on both circumferential sides.

The half thrust bearing 8 according to the present example is in the following relation to the half bearing 7.

That is to say, in the half thrust bearing 8 according to the present example, a circumferential end region length L of the circumferential end region 800 at an inner-diameter-side end surface 8*i* of the half thrust bearing 8 is larger than a crush relief length CL of the crush relief 73 of the half bearing 7.

Herein, the crush relief length CL is the height from the horizontal plane to the upper edge of the crush relief 73 in the case that both circumferential end surfaces 74, 74 of the half bearing 7 are put on the horizontal plane so as to be lower end surfaces (see FIG. 4). The crush relief lengths of the crush reliefs 73 on both sides of the circumferential ends of the half bearing 7 are the same. In contrast to the present example, the crush relief length of the crush relief 73 of the half bearing 7 may vary in the axial direction of the half bearing 7.

The effects of the present example will be described below.

As illustrated in FIGS. 12A and 12B, immediately after flowing out from the crush relief clearance of the half bearing 7, the lubrication oil circumferentially flows along the surface of the journal portion of the rotating crankshaft, and therefore flows toward the forward side of the rotation direction of the journal portion 11 from the position of the crush relief 73 due to the inertial force which causes the oil to move to the forward side of the rotation direction of the crankshaft (see the broken arrows).

The circumferential end region length L of the circumferential end region 800 at the inner-diameter-side end surface 8*i* of the half thrust bearing 8 of the bearing device 1 according to the present example is larger than the crush relief length CL of the crush relief 73 of the half bearing 7. Accordingly, the lubrication oil (including foreign matters) flowing out from the crush relief clearance of the half bearing 7 and flowing from the position of the crush relief 73 toward the forward side of the rotation direction of the journal portion 11 first moves toward the inner-diameter-side end surface 8*i* of the circumferential end region 800, and therefore, the foreign matters included in the lubrication oil are not easily deposited on the surface of the soft bearing alloy layer 85 at the inner-diameter-side end surface 8*i*.

As specific dimensions of the crush relief 73 of the half bearing 7, the crush relief length CL is 3 to 7 mm, and a depth of the crush relief 73 from a virtual extended surface, which is an extension of a slide surface 75, to the crush relief at the circumferential end surface 74 is 0.01 to 0.1 mm, in the case of a crankshaft of a small internal combustion engine such as a passenger vehicle (a diameter of the journal portion is about 30 to 100 mm), for example.

The circumferential end region length L of the circumferential end region 800 at the inner-diameter-side end surface 8*i* of the half thrust bearing 8 preferably satisfies the formula: $L \geq 1.5 \times CL$, in relation to the crush relief length CL of the crush relief of the half bearing 7 located at a corresponding position.

While the examples of the present invention have been described in detail with reference to the drawings, specific configurations are not limited to the examples, and the present invention permits change in design to the extent which does not depart from the spirit of the present invention.

Figure 18:
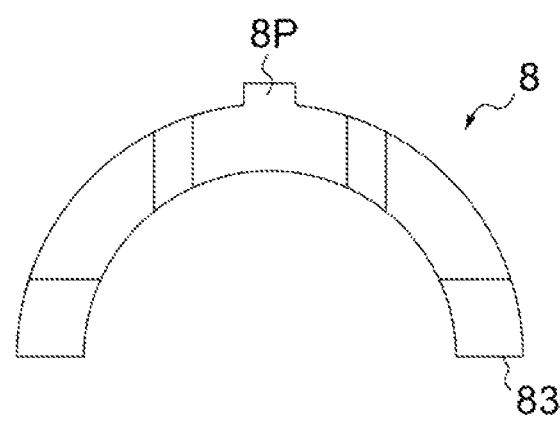
FIG. 18 is a front view of a half thrust bearing according another embodiment.

For example, as illustrated in FIG. 18, the present invention may be applied also to a half thrust bearing 8 having a radially outwardly protruding protrusion 8p for positioning and rotation prevention.

Figure 19:
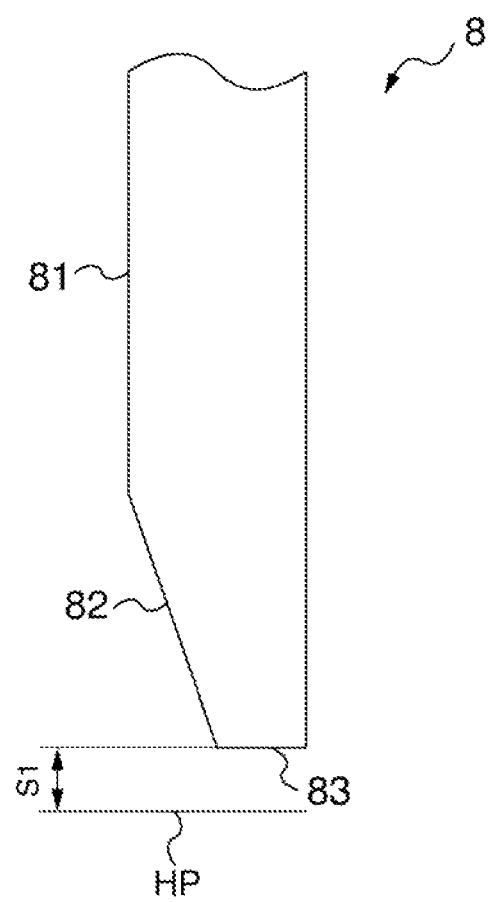
FIG. 19 is a side view of the vicinity of a circumferential end of a half thrust bearing according to another embodiment.

Moreover, as illustrated in FIG. 19, the circumferential length of the half thrust bearing 8 may be shorter than the half thrust bearing 8 illustrated in Example 1 by a predetermined length S1.

A chamfer may be formed circumferentially on the outer-diameter-side edge or inner-diameter-side edge on the slide surface 81 side of the half thrust bearing 8. Note that, even when a chamfer is formed on the outer-diameter-side edge or inner-diameter-side edge on the slide surface 81 side, the thicknesses T2, T5 and T6 of the decreased thickness portion 89 and the increased thickness portion 90 of the bearing alloy layer 85 are defined as thicknesses measured from the slide surface 81 (the surface of the bearing alloy layer 85) as in the case that no chamfer is formed.

Similarly, a chamfer may be also formed circumferentially on the outer-diameter-side edge or inner-diameter-side edge of the thrust relief surface 82S. Particularly even when a chamfer is formed on the outer-diameter-side edge or inner-diameter-side edge of the second region 822, the thicknesses T4 and T6 of the decreased thickness portion 89 and the increased thickness portion 90 of the bearing alloy layer 85 are defined as thicknesses measured from the second region 822 (or the thrust relief surface 82S) as in the case that no chamfer is formed.

Figure 20:
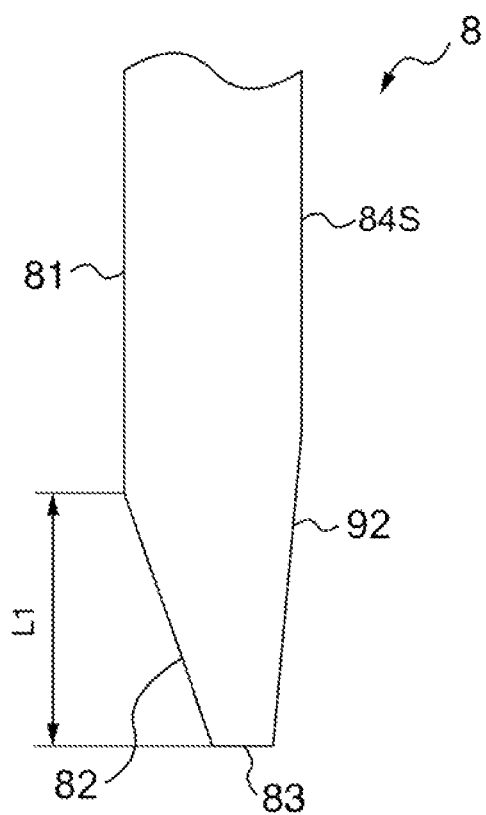
FIG. 20 is a side view of the vicinity of a circumferential end of a half thrust bearing according to another embodiment.

Furthermore, as illustrated in FIG. 20, the half thrust bearing 8 may include, on a back surface 84S side of the back metal layer 84, a back surface relief 92 which is adjacent to both circumferential end surfaces 83 and has a shape similar to that of the thrust relief 82.

Figure 21:
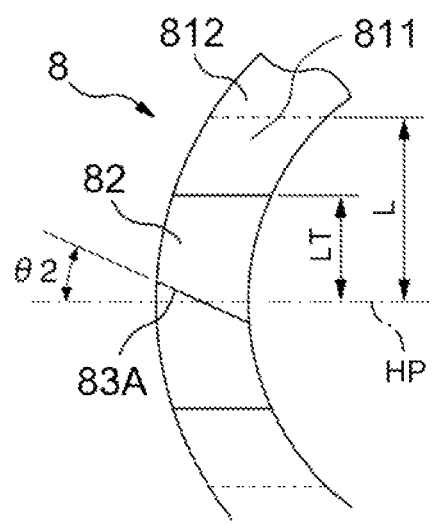
FIG. 21 is a front view of the vicinity of circumferential ends of half thrust bearings according to another embodiment.

For prevention of wrong assembly, in only one of two abutment portions of a pair of the half thrust bearings 8, the circumferential end surfaces of the respective half thrust bearings 8 may be formed as inclined end surfaces 83A and abut on each other, as illustrated in FIG. 21. In this case, the inclined end surfaces 83A are formed to be inclined at a predetermined angle θ2 to a plane (split plane HP) passing through the circumferential end surface 83 of the other abutment portion which is not inclined. Alternatively, each circumferential end surface can be formed as another shape such as an uneven shape instead of the inclined end surface 83A.

However, it will be appreciated by those skilled in the art that in each case, a thrust relief length LT is defined as the perpendicular length from the split plane HP of the half thrust bearing 8 to a point where the surface of the thrust relief 82 intersects the inner peripheral edge of the slide surface 81. Similarly, the length L of the circumferential end region 800 is defined as a length perpendicularly measured from the split plane HP of the half thrust bearing 8 to a boundary between the circumferential end region 800 and a fourth region 812.

Although four half thrust bearings 8 are used in the bearing device 1 in Example 4, the present invention is not limited thereto, and desired effects can be obtained by using at least one half thrust bearing 8 according to the present invention. Moreover, the half thrust bearing 8 according to the present invention and a conventional half thrust bearing may be used as a pair to be as a circular-ring-shaped thrust bearing. Further, in the bearing device 1 according to the present invention, the half thrust bearing 8 may be formed integrally with the half bearing 7 in one or both axial end surfaces of the half bearing 7 which rotatably bears a crankshaft.

The invention claimed is:

1. A semi-annularly shaped half thrust bearing for receiving axial force of a crankshaft of an internal combustion engine, wherein the half thrust bearing comprises a back metal layer made of an iron alloy, and a bearing alloy layer provided on a surface of the back metal layer, the bearing alloy layer forming a slide surface which receives the axial force, the back metal layer forming a back surface parallel to the slide surface, the half thrust bearing comprises two thrust reliefs formed adjacent to both circumferential end surfaces thereof, each of the thrust reliefs comprising a flat thrust relief surface extending between the slide surface and the circumferential end surface, so that a wall thickness of the half thrust bearing becomes smaller from a slide surface side toward a circumferential end surface side in the thrust relief, each of the thrust relief surfaces comprises a first region on the circumferential end surface side that consists of a surface in which the back metal layer is exposed, and a second region on the slide surface side that consists of a surface in which the bearing alloy layer is exposed, and the slide surface comprises two third regions adjacent to the second regions of the thrust relief surfaces, respectively, and a fourth region between the two third regions, so that a circumferential end region consisting of the first region, the second region and the third region is defined, a circumferential end region length, measured perpendicularly to a split plane of the half thrust bearing, from the split plane to a boundary between the third region and the fourth region is constant between an inner-diameter-side end surface and an outer-diameter-side end surface of the half thrust bearing, and is equivalent to a circumferential angle between 15° at a minimum and 35° at a maximum from the split plane toward a circumferentially central side of the half thrust bearing at the inner-diameter-side end surface, in any cross-section parallel to the split plane, the bearing alloy layer in the second regions and the third regions comprises a uniform thickness portion, in which a thickness of the bearing alloy layer is constant, in a range including a radial center of the half thrust bearing, and a decreased thickness portion, in which a thickness of the bearing alloy layer is smaller than the uniform thickness portion, in a range adjacent to the inner-diameter-side end surface, and in any radial cross-section including an axis of the half thrust bearing, the bearing alloy layer in the fourth region comprises a uniform thickness portion, in which a thickness of the bearing alloy layer is constant, in a range including the radial center of the half thrust bearing, and an increased thickness portion, in which a thickness of the bearing alloy layer is larger than the uniform thickness portion, or the uniform thickness portion, in a range adjacent to the inner-diameter-side end surface.

2. The half thrust bearing according to claim 1, wherein, in any cross-section parallel to the split plane, the bearing alloy layer in the second regions and the third regions further comprises an increased thickness portion, in which a thickness of the bearing alloy layer is larger than the uniform thickness portion, in a range adjacent to the outer-diameter-side end surface.

3. The half thrust bearing according to claim 1, wherein a third region length, measured perpendicularly to the split plane, from a boundary between the second region and the third region to the boundary between the third region and the fourth region is 10 to 50% of the circumferential end region length at the inner-diameter-side end surface.

4. The half thrust bearing according to claim 1, wherein a second region length, measured perpendicularly to the split plane, from a boundary between the first region and the second region to a boundary between the second region and the third region is 20 to 70% of a thrust relief length from the split plane to the boundary between the second region and the third region at the inner-diameter-side end surface.

5. The half thrust bearing according to claim 1, wherein, in any radial cross-section including the axis of the half thrust bearing, the bearing alloy layer in the fourth region further comprises an increased thickness portion, in which a thickness of the bearing alloy layer is larger than the uniform thickness portion, in a range adjacent to the outer-diameter-side end surface.

6. The half thrust bearing according to claim 1, wherein a curvature center of the inner-diameter-side end surface in the circumferential end region is at a position different from a curvature center of the inner-diameter-side end surface in the fourth region.

7. A bearing device for a crankshaft of an internal combustion engine, comprising: a crankshaft; a pair of half bearings for supporting a journal portion of the crankshaft, each of the half bearings comprising two crush reliefs formed adjacent to both circumferential end surfaces thereof on an inner-peripheral-surface side; a bearing housing comprising a holding hole for holding the pair of half bearings, the holding hole being formed to penetrate the bearing housing; and at least one semi-annularly shaped half thrust bearing according to claim 1, the semi-annularly shaped half bearing being arranged adjacent to the holding hole on an axial end surface of the bearing housing to receive the axial force of the crankshaft, wherein the circumferential end region length is larger than a crush relief length of the crush relief at an axial end of the half bearing.

8. The bearing device according to claim 7, wherein the circumferential end region length at the inner-diameter-side end surface of the half thrust bearing is 1.5 times or more the crush relief length at the axial end of the half bearing.

\* \* \* \* \*